June 19, 1956 — J. H. HOLLYDAY ET AL — 2,750,811
BALER CRANK CONSTRUCTION
Filed April 8, 1952
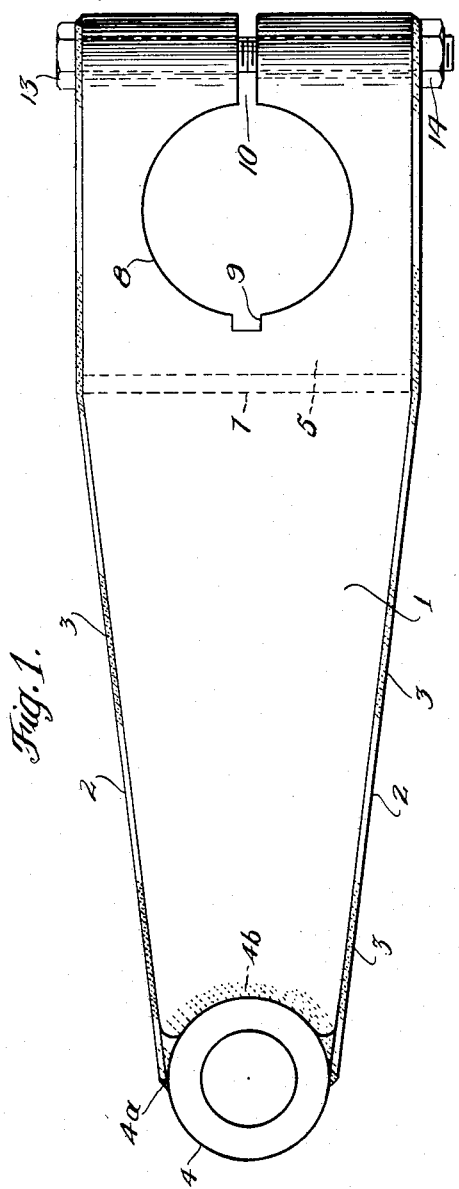
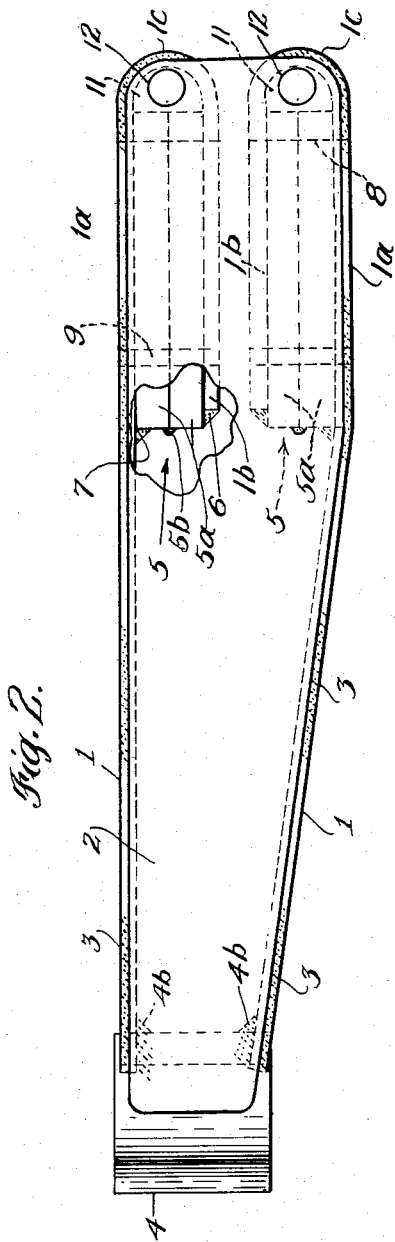
INVENTOR.
James H. Holliday
Edwin B. Nolt
BY Richard E. Babcock Jr.
Attorney though the present improvements produce a structure in which the metal or sheet material is utilized efficiently, a structural configuration which can be very easily fabricated, the arrangement being such that the necessary physical strength is secured without resort to heavy forgings, castings and the like. The structure will also be seen to avoid any necessity for costly drilling operations as in the case of the integral hub constructions commonly used in the past.

United States Patent Office 2,750,811
Patented June 19, 1956

2,750,811

BALER CRANK CONSTRUCTION

James H. Hollyday and Edwin B. Nolt, New Holland, Pa., assignors, by mesne assignments, to Sperry Rand Corporation, a corporation of Delaware Application April 8, 1952, Serial No. 281,242

4 Claims. (Cl. 74—595)

This invention relates to a crank construction of a type which is particularly adapted for use in heavy machinery, as for instance in automatic hay balers to drive the pitman of the reciprocating baler plunger. It will be appreciated however, that the invention is by no means restricted to this particular use, but is capable of other applications.

In forming cranks of this type, it has been customary in the past either to form the crank as a one piece integral structure, or alternatively to form the hub portion of the crank of one piece while forming the free end portion of the crank of lighter construction and securing it onto the hub portion to thereby effect a saving both in the material employed and the machining thereof. In either case the integral hub construction has been considered necessary in order to secure the requisite strength needed for keying or otherwise rigidly securing the crank in fixed relation on a rotating drive shaft for movment therewith so that a reciprocating element connected to the free end of the crank may be driven from the said drive shaft.

With this in mind, it is the primary aim of the present invention to produce a strong and economical crank construction in which the hub and other portions of the crank are fabricated primarily from comparatively thin and cheap metal sheets or plates, and which necessitates no heavy castings, forgings or the like for forming the hub through which the crank is fixed on a drive shaft.

It is a further object to provide the crank with a novel clamp construction for securing same on a shaft, which the sheet material or plates forming the crank may be economically formed by usual metal stamping and bending operations, to define passageways for the clamp bolts without necessitating expensive drilling operations.

Further incidental objects and advantages will be apparent from the accompanying description considered in conjunction with the accompanying drawings, in which:

Figure 1 represents a side elevation of a crank embodying the invention; and,

Figure 2, an edge elevation of the crank shown in Figure 1, the clamp bolts being removed and a portion of the crank structure being broken away to permit a clearer view of the interior thereof.

Referring now in detail to the accompanying drawings, the crank illustrated therein comprises sheet metal or plate metal sides 1 which are rigidly connected in opposed relation by suitable means such as the sheet metal edge plates or members 2 welded along their longitudinal edges as at 3 to the respective side plates or sides 1 to form a rigid generally tubular crank structure. In this structure it will be seen that sides 1 are relied on to supply the necessary rigidity to the crank in the plane of its rotation, while the edge plates 2 merely serve to impart lateral rigidity to the structure.

In order that the free end of the crank structure may be operatively connected in usual manner to a pitman, a bearing 4 may be welded as at 4a and 4b to the free ends of the respective edges 2 and sides 1. The axis of the bearing extends perpendicularly to the sides 1, the free ends of which are formed with arcuate recesses or cradles as shown to conformingly receive the outer cylindrical surface of the bearing 4.

In addition to its main outer portion 1a, each of the sides 1 at the hub end of the crank construction comprises an inwardly and reversely bent inner portion 1b disposed preferably internally of the tubular construction and in parallel relation to the outer portion 1a, the portions 1a and 1b being integrally connected by a U-curved end portion 1c.

Interposed between the inner and outer portions 1a and 1b of each side member is a reinforcing pad 5 which is rigidly secured to the respective inner and outer side portions 1a, 1b, as being welded thereto as at 6 and 7 respectively. If desired, each of the pads 5 may be fabricated from a plurality of thicknesses or laminations 5a of material welded together, as at 5b, thereby reducing the cost of material and the difficulty of fabricating the same. The inner and outer portions 1a, 1b, of the two sides 1 and their respective pads 5 are formed with a shaft receiving bore 8 therethrough and, if desired, a keyway 9 at one side of and communicating with the bore 8, to permit keying of a shaft through said bore in usual manner.

Also, the side plates 1 and pads 5 are formed with a slot 10 of appreciable width opening in an endwise direction from the bore 8 through the adjacent ends 1c of the respective crank sides. Thus the slots 10 and bore 8 divide the hub end of the crank structure into oppositely disposed clamp segments on either side of the slot 10 and bore 9. The pad 5 of each side 1 is spaced somewhat from the end portion 1c of its respctive side to therewith define a passageway 11 perpendicular to the axis of the shaft bore 8. Also, the metal edge plates 2 are formed with openings 12 therethrough aligned with and constituting continuations of the respective passage ways 11, so that threaded clamp elements or bolts 13 (see Figure 1) disposed through said passageways and said ends may have nuts 14 threaded thereon to draw the clamp segments of the crank hub together into tight clamping engagement about a shaft disposed through the bore 8.

In the operation of such a crank where same is operatively disposed on a drive shaft it will be seen that the laminated or built up hub portion of the crank is of very substantial thickness or axial extent to provide a strong and satisfactory fixed connection with the drive shaft received in the bore 8. Notwithstanding this, all of the parts entering into the hub construction are of relatively thin and cheap also easily fabricated construction. Moreover, the reversely bent formation of the respective sides at the hub end of the structure will be seen to materially contribute to its strength inasmuch as there are thus provided two portions or locations which may be secured at 6 and 7 respectively to the pad 5, while at the same time the U-curved ends 1c of the respective sides serve to reinforce and stiffen the edge plates 3 whereby same are enabled to withstand the clamping pressure applied by the bolt 13.

It will be seen that, by disposing the pads 5 between the outer and inner side portions 1a and 1b and in spaced relation to the end portions 1c of the sides, the passageways 11 for the clamp bolts 13 are formed simply as an incident to the fabrication of the crank, and without necessitating expensive drilling operations as is the case where the hub is of integral metal construction.

In this application we have shown and described only the preferred embodiment of our invention as by law required. However, we recognize that our invention is capable of other and different embodiments and that the several details thereof may be modified in various ways, all without departing from our invention. Accordingly, the drawings and description herein are to be considered as merely illustrative in nature and not as exclusive.

Having thus described our invention, we claim:

1. A crank construction comprising a pair of relatively spaced sheet metal sides and a pair of spaced sheet metal edge plates, said sides and edge plates being connected to form a tubular structure, each said side comprising a main outer portion, an inwardly and reversely bent portion parallel to said outer portion interiorly of the tubular structure, and a curved end portion integrally connecting said inner and outer portions, a reinforcing pad disposed between and rigidly connected to said inner and outer portions, said inner and outer portions and said pad being formed with a shaft bore therethrough at the hub end of the crank construction, said pad being spaced from said end portion to define a passageway perpendicular to the axis of said bore, the edge plates having openings therethrough aligned with said passageway, said sides and pads being formed with a slot opening longitudinally from the shaft bore to the adjacent end of the crank and dividing the hub end of the crank structure into oppositely disposed clamp segments, a clamp bolt being operatively disposed through each said passageway and said edge plates to draw said clamp segments together about a shaft disposed through said bore.

2. A crank construction comprising relatively opposed sides and relatively opposed edge plates rigidly connected in tubular formation, each said side comprising a main outer portion, an inwardly and reversely bent inner portion interiorly of the tubular formation, and an end portion integrally connecting said inner and outer portions, a reinforcing pad being disposed between and rigidly connected to said inner and outer portions, said portions and said pad being formed with a bore therethrough at the hub end of the crank, said pad being spaced from said end portion to therewith define a passageway perpendicular to the axis of the bore, said edge plates having openings therethrough aligned with and forming part of said passageway, said sides and pads being formed with slots opening from the said bore through said end portions and dividing the hub end of the crank into relatively opposed clamp segments, threaded means being disposed through the passageways of said sides to draw the clamp segments together.

3. A crank construction comprising relatively opposed sides and means rigidly connecting same in opposed generally parallel relation, each side comprising a main outer portion, an inwardly and reversely bent inner portion, and an end portion integrally connecting said inner and outer portions, a reinforcing pad being disposed between and rigidly connected to said inner and outer portions, said portions and pad being formed with a bore therethrough at the hub end of the crank construction, the pad being spaced from said end portion to therewith define a passageway perpendicular to the axis of the bore, said sides and pads being formed with slots opening from the bore through the said end portions and dividing the hub end of the crank construction into relatively opposed clamp segments, whereby threaded means disposed through the passageways of said sides may draw the clamp segments together.

4. A crank construction comprising an elongated metal plate including a main portion and a reversely bent portion spaced from and generally parallel to said main portion, an end portion integrally connecting said main portion and said reversely bent portion, a separate reinforcing insert pad disposed between said main portion and said reversely bent portion adjacent said connecting end portion, said pad extending parallel to and being rigidly connected to said main portion and said reversely bent portion, said portions and said pad being formed with a bore therethrough at the hub end of the crank, the pad being spaced from said end portion to therewith define a passageway perpendicular to the axis of the bore, said plate and pad being formed with a slot opening from the said bore through said end portion and dividing the hub end of the crank into relatively opposed clamp segments, and threaded means disposed through the said passageway to draw the clamp segments together.

References Cited in the file of this patent

UNITED STATES PATENTS

| 1,306,119 | Pharo | June 10, 1919 |
| 1,647,252 | Russell | Nov. 1, 1927 |
| 1,911,458 | Mitchell | May 30, 1933 |
| 2,350,468 | Kraeft | June 6, 1944 |

FOREIGN PATENTS

| 979,584 | France | Dec. 13, 1950 |

OTHER REFERENCES

Publication: Product Engineering, pp. 388–389, July 1942.